(12) United States Patent
Nakamura

(10) Patent No.: US 8,659,776 B2
(45) Date of Patent: Feb. 25, 2014

(54) PRINT JOB MANAGEMENT SERVER WHICH MANAGES PRINT JOBS TO BE PROCESSED BY AN IMAGE FORMING APPARATUS

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 13/194,847

(22) Filed: Jul. 29, 2011

(65) Prior Publication Data

US 2012/0050795 A1    Mar. 1, 2012

(30) Foreign Application Priority Data

Aug. 27, 2010  (JP) .................................. 2010-191393

(51) Int. Cl.
   *G06F 3/12* (2006.01)

(52) U.S. Cl.
   USPC ........................................................ 358/1.15

(58) Field of Classification Search
   USPC ........................................................ 358/1.15
   See application file for complete search history.

(56) References Cited

U.S. PATENT DOCUMENTS

| | | | |
|---|---|---|---|
| 6,115,132 A | 9/2000 | Nakatsuma et al. | |
| 7,142,317 B2 | 11/2006 | Naito et al. | |
| 7,826,083 B2 | 11/2010 | Nakamura | |
| 2007/0216925 A1 | 9/2007 | Nakamura | |

FOREIGN PATENT DOCUMENTS

| | | |
|---|---|---|
| CN | 1329299 A | 1/2002 |
| JP | 10-240480 A | 9/1998 |
| JP | 2005129006 A | 5/2005 |
| JP | 2008282311 A | 11/2008 |

OTHER PUBLICATIONS

Derwent English Language Abstract of JP 2005129006 to Hisaku et al. May 19, 2005.*
Chinese Office Action dated Oct. 23, 2013 issued in corresponding Chinese Patent Application No. 201110243560.6.

* cited by examiner

*Primary Examiner* — Eric A Rust
(74) *Attorney, Agent, or Firm* — Fitzpatrick, Cella, Harper & Scinto

(57) ABSTRACT

A print server in a print job management system including an information processing apparatus, a print server, and an image forming apparatus, comprises: a management unit configured to receive a print request from the information processing apparatus, and to manage a status of a print job to be executed by the image forming apparatus in response to the print request; and a request receiving unit configured to receive the print request from the information processing apparatus, and to return a response to the print request, wherein the request receiving unit returns the response including a command which controls the information processing apparatus to send a status acquisition request of a print job to the image forming apparatus to the information processing apparatus, and the management unit updates a status of the managed print job in accordance with a status of the print job received from the information processing apparatus.

11 Claims, 17 Drawing Sheets

F I G. 3
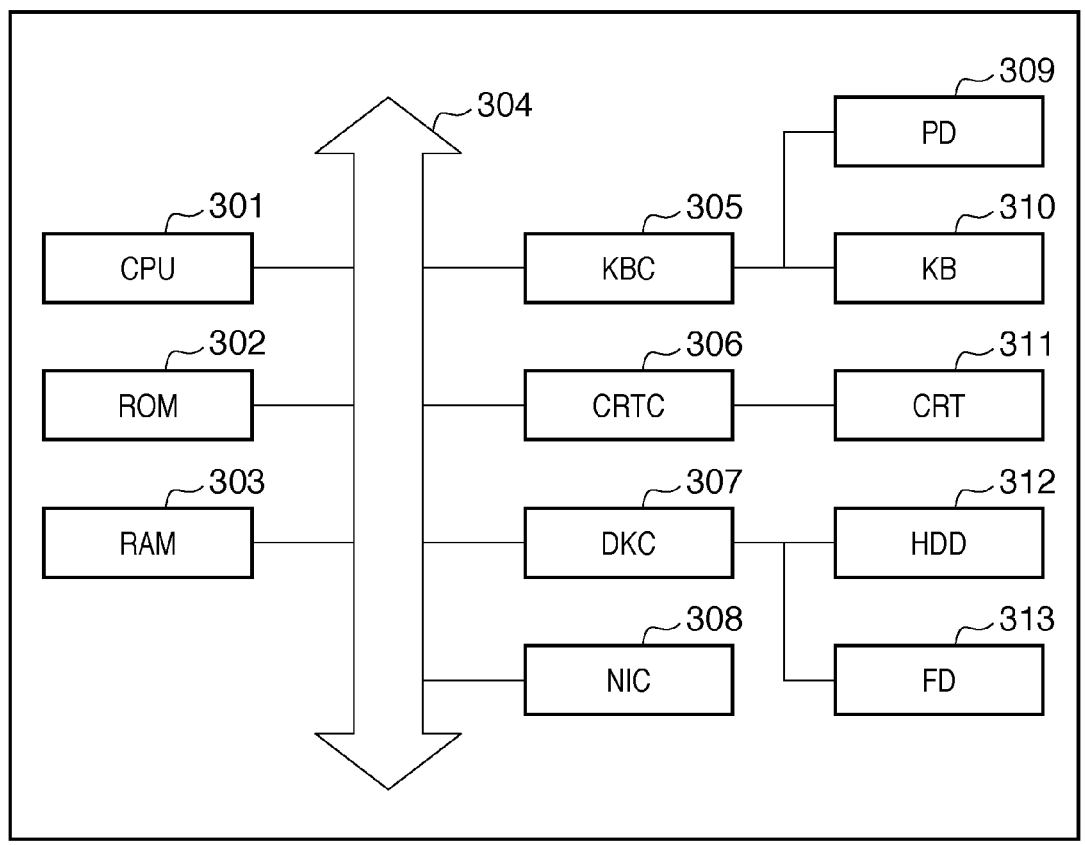

FIG. 5A

| ID | DOCUMENT NAME | USER NAME | PRINT STATUS | PRINT JOB ACQUISITION REQUEST RECEPTION TIME |
|---|---|---|---|---|
| 1 | test.doc | user1 | PRINT IN PROGRESS | 2010/4/1 12:00 |
| 2 | aaa.ppt | user2 | PRINT IN PROGRESS | 2010/4/1 12:03 |
| 3 | bbb.doc | user1 | PRINT IN PROGRESS | 2010/4/1 12:04 |

FIG. 5B

| ID | DOCUMENT NAME | USER NAME | PRINT STATUS | PRINT JOB ACQUISITION REQUEST RECEPTION TIME | PRINT PREDICTED TIME |
|---|---|---|---|---|---|
| 1 | test.doc | user1 | PRINT IN PROGRESS | 2010/4/1 12:00 | 8 MINUTES |
| 2 | aaa.ppt | user2 | PRINT IN PROGRESS | 2010/4/1 12:03 | 1 MINUTES |
| 3 | bbb.doc | user1 | PRINT IN PROGRESS | 2010/4/1 12:04 | 10 MINUTES |

FIG. 5C

| ID | DOCUMENT NAME | USER NAME | PRINT STATUS | PRINT JOB ACQUISITION REQUEST RECEPTION TIME | PRINT STATUS LAST UPDATE TIME |
|---|---|---|---|---|---|
| 1 | test.doc | user1 | PRINT IN PROGRESS | 2010/4/1 12:00 | 2010/4/1 12:05 |
| 2 | aaa.ppt | user2 | PRINT IN PROGRESS | 2010/4/1 12:03 | 2010/4/1 12:07 |
| 3 | bbb.doc | user1 | PRINT IN PROGRESS | 2010/4/1 12:04 | 2010/4/1 12:05 |

F I G. 8

| | DOCUMENT NAME | DATE | NUMBER OF PAGES | SIZE | PRINT STATUS |
|---|---|---|---|---|---|
| ☐ | aaa.doc | 2010/4/1 10:00 | 10p | 100k | — |
| ☐ | bbb.pdf | 2010/4/10 12:00 | 5p | 200k | PRINT IN PROGRESS |
| ☐ | ccc.doc | 2010/4/20 9:00 | 20p | 300k | PRINT IN PROGRESS |

DOCUMENT LIST 1006  1001  1002  1003  1004  1005

PRINT  UPDATE 1007  1008

FIG. 15A

```
<GetJobsRequest>
</GetJobsRequest>
```

FIG. 15B

```
<GetJobsResponse>
    <Jobs>
        <Job>
            <JobId>3<JobId>
            <JobStatus>Processing<JobStatus>
            <JobName>test.doc</JobName>
            <JobUser>user 1</JobUser>
        </Job>
        <Job>
            <JobId>4<JobId>
            <JobStatus>Processing<JobStatus>
            <JobName>aaa.doc</JobName>
            <JobUser>user 2</JobUser>
        </Job>
    </Jobs>
</GetJobsResponse>
```

FIG. 15C

```
<NotifyJobStatus>
    <Jobs>
        <Job>
            <JobId>1<JobId>
            <JobStatus>Cancelled<JobStatus>
            <JobName>test.doc</JobName>
            <JobUser>user 1</JobUser>
        </Job>
    </Jobs>
</NotifyJobStatus>
```

FIG. 15D

```
<NotifyJobStatus>
    <Jobs>
        <Job>
            <JobId>1<JobId>
            <JobStatus>Processing<JobStatus>
            <JobName>test.doc</JobName>
            <JobUser>user 1</JobUser>
        </Job>
    </Jobs>
</NotifyJobStatus>
```

PRINT JOB MANAGEMENT SERVER WHICH MANAGES PRINT JOBS TO BE PROCESSED BY AN IMAGE FORMING APPARATUS

BACKGROUND OF THE INVENTION

1. Field of the Invention

The present invention relates to a print job management system which manages print jobs to be processed by an image forming apparatus and a control method thereof, an information processing apparatus, and a print server and, more particularly, to a method associated with a status notification of a print job in the print job management system.

2. Description of the Related Art

Conventionally, especially in case of printing in a large-scale environment, it is a common practice to temporarily spool a print job in a print server and to then send the print job to a printer in place of directly sending a print job from a personal computer (PC) operated by the user to the printer. In case of such printing via the print server, the print server periodically sends an inquiry about a status of the sent print job to the printer, thus managing the print job.

In recent years, a service is available that is called cloud computing (to be referred to as "cloud" hereinafter) which allows the user to use only computer resources needed on a large-scale data center connected via the Internet. Using this service, a print server can be allocated on the cloud. Use of the cloud can provide various merits. For example, the need for hardware management can be obviated, and it is easy to add resources according to the load on the server. When the print server is allocated on the cloud, a firewall is normally set between the printer and print server in terms of security, and the print server side cannot directly send a print job to the printer side. For this reason, as the sequence of a print job, a PULL type (pull-print) sequence in which the printer acquires a print job from the print server is adopted in place of a PUSH type (push-print) sequence in which the print server sends a print job to the printer.

On the other hand, conventionally, a client-side script technique is known as a Web technique. The client-side script does not specify a specific script language, but JavaScript® is normally used. When a Web browser accesses a Web server, the JavaScript is returned from the Web server as a response, and is executed on the Web browser.

For example, Japanese Patent Laid-Open No. 2008-282311 discloses a technique which allows a network multifunction peripheral (MFP) including a Web server function to return the JavaScript in response to an information acquisition request from a Web browser. The JavaScript includes a script which periodically sends an information acquisition request to the network MFP, and device and job statuses can be displayed on the Web browser in real time without requiring any user operations. Japanese Patent Laid-Open No. 2005-129006 discloses a technique which allows a print management server to return the JavaScript in response to a print request from a Web browser. The JavaScript includes a script which notifies the print management server of a print execution result, and can automatically notify the print management server of a result after completing printing.

A case will be assumed wherein a print server is allocated on the cloud in a print system using the print server. As described above, since a firewall exists between a printer and the print server, the printer sends an acquisition request of a print job to the print server. Likewise, when the print server manages a status of a print job, the printer has to notify the print server of the status of the print job to update the status of the print job managed on the print server.

However, when the printer somehow fails to notify the print server of the status of the print job, the print server can no longer detect the actual status of the print job. For example, when the power supply of the printer is turned off/on before completion of the print job, the print job itself is deleted in the printer. For this reason, the printer can no longer notify the print server of the status of that print job. As a result, in the print server, that job unwantedly has a "print in progress" status indefinitely, thus posing a problem.

SUMMARY OF THE INVENTION

The present invention has been made to solve the aforementioned problems, and provides a print job management system which allows a print server to manage a status of a print job even when a printer cannot notify the print server of the status of that print job.

According to one aspect of the present invention, there is provided a print job management system including an information processing apparatus, a print server, and an image forming apparatus, wherein the print server comprises: a management unit configured to receive a print request from the information processing apparatus, and to manage a status of a print job to be executed by the image forming apparatus in response to the print request; and a request receiving unit configured to receive the print request from the information processing apparatus, and to return a response to the print request, the request receiving unit returns the response including a command which controls the information processing apparatus to send a status acquisition request of a print job to the image forming apparatus, the management unit updates a status of the managed print job in accordance with a status of the print job received from the information processing apparatus, and the information processing apparatus comprises: a sending unit configured to send the print request to the print server; a request unit configured to send the status acquisition request of the print job to the image forming apparatus to the image forming apparatus in accordance with the command included in the response from the print server to the print request sent by the sending unit; and a notification unit configured to notify the print server of a status of the print job returned from the image forming apparatus as a response to the status acquisition request of the print job sent by the request unit.

According to another aspect of the present invention, there is provided a print server in a print job management system including an information processing apparatus, a print server, and an image forming apparatus, comprising: a management unit configured to receive a print request from the information processing apparatus, and to manage a status of a print job to be executed by the image forming apparatus in response to the print request; and a request receiving unit configured to receive the print request from the information processing apparatus, and to return a response to the print request, wherein the request receiving unit returns the response including a command which controls the information processing apparatus to send a status acquisition request of a print job to the image forming apparatus to the information processing apparatus, and the management unit updates a status of the managed print job in accordance with a status of the print job received from the information processing apparatus.

According to another aspect of the present invention, there is provided an information processing apparatus in a print job management system including an information processing apparatus, a print server, and an image forming apparatus, comprising: a sending unit configured to send a print request to the print server; a request unit configured to send a status acquisition request of a print job to the image forming apparatus to the image forming apparatus in accordance with a command included in a response from the print server to the print request sent by the sending unit; and a notification unit configured to notify the print server of a status of the print job returned from the image forming apparatus as a response to the status acquisition request of the print job sent by the request unit.

According to another aspect of the present invention, there is provided a control method in a print job management system including an information processing apparatus, a print server, and an image forming apparatus, comprising: in the print server, a management step of receiving a print request from the information processing apparatus, and to manage a status of a print job to be executed by the image forming apparatus in response to the print request; a request receiving step of receiving the print request from the information processing apparatus, and returning a response to the print request, in the request receiving step, the response including a command which controls the information processing apparatus to send a status acquisition request of a print job to the image forming apparatus being returned to the information processing apparatus, in the management step, a status of the managed print job being updated in accordance with a status of the print job received from the information processing apparatus; in the information processing apparatus, a sending step of sending the print request to the print server; a request step of sending the status acquisition request of the print job to the image forming apparatus to the image forming apparatus in accordance with the command included in the response from the print server to the print request sent in the sending step; and a notification step of notifying the print server of a status of the print job returned from the image forming apparatus as a response to the status acquisition request of the print job sent in the request step.

According to the present invention, a print job management system which allows a print server to manage a status of a print job even when a printer cannot notify the print server of the status of that print job can be provided.

Further features of the present invention will become apparent from the following description of exemplary embodiments (with reference to the attached drawings).

BRIEF DESCRIPTION OF THE DRAWINGS

FIG. 3 is a block diagram showing the hardware arrangement;

FIGS. 5A, 5B, and 5C show examples of management tables managed by a print control unit 503;

FIG. 8 shows an example of a screen which displays a document list on a print server 103;

FIGS. 15A, 15B, 15C, and 15D show description examples of a request/response;

DESCRIPTION OF THE EMBODIMENTS

Embodiments for carrying out the present invention will be described hereinafter with reference to the drawings.

<First Embodiment>

[Hardware Arrangement]

Figure 1:
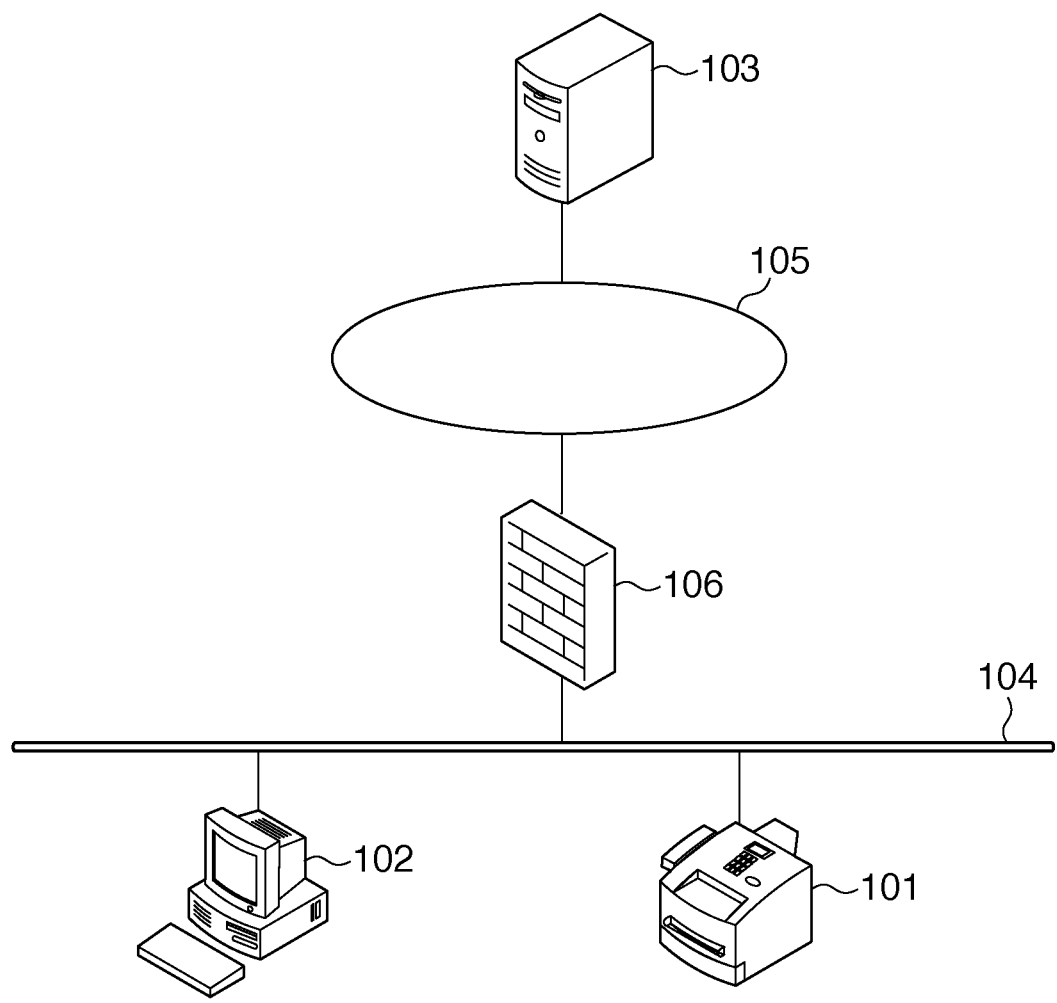
FIG. 1 is a view showing the system configuration of a print job management system.

FIG. 1 shows the system configuration of a print job management system to which the present invention is applied. Referring to FIG. 1, an image forming apparatus 101, host computer 102, and print server 103 are connected via a network to configure a print job management system. Note that FIG. 1 shows the image forming apparatus, host computer, and print server by one each, but a plurality of image forming apparatuses, host computers, and print servers may be connected.

The image forming apparatus 101 includes a function for receiving a print job spooled in the print server 103 as a printing server and printing the received print job. The host computer 102 is a terminal which is used to issue a print instruction, and displays status information of print jobs, and can be, for example, a mobile phone in place of a general personal computer (PC) as long as it includes a Web browser. The print server 103 includes a function for spooling print jobs, and managing status information of the print jobs, and also a document management server function which manages documents for respective users in this embodiment. Note that in this embodiment, information indicating a status of a print job will be simply described as "status" or "information of a print job".

The image forming apparatus 101 and host computer 102 are connected within an intranet 104. The apparatuses within the intranet 104 and the print server 103 connected on an Internet 105 communicate with each other via a firewall 106 set between the intranet 104 and Internet 105. By setting this firewall 106, communications between the apparatuses on the intranet 104 side and the Internet 105 side are restricted, thus enhancing, for example, security. Therefore, this configuration inhibits the apparatuses on the Internet 105 side from freely establishing connections to those on the intranet 104 side.

Figure 2:
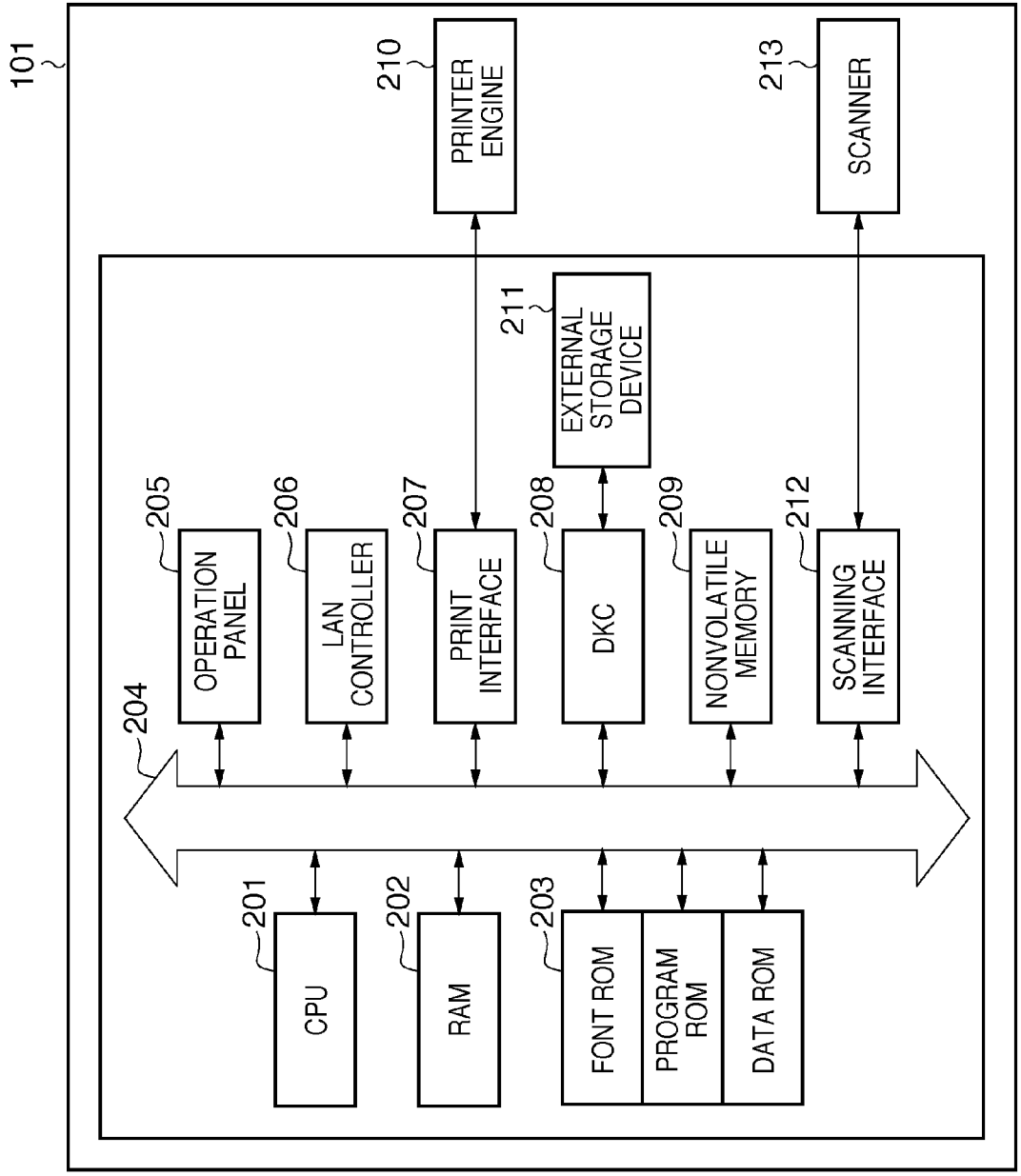
FIG. 2 is a block diagram showing the hardware arrangement of an image forming apparatus 101.

FIG. 2 is a block diagram showing the hardware arrangement of the image forming apparatus 101. Note that a copying machine will be exemplified below. In the image forming apparatus 101 shown in FIG. 2, a CPU 201 systematically controls accesses to various devices connected to a system bus 204 based on control programs stored in a program ROM of a ROM 203 or an external storage device 211. The CPU 201 outputs an image signal as output information to a print unit (printer engine) 210 connected via a print interface 207, and controls an image signal input from a scanning unit (scanner) 213 connected via a scanning interface 212. The program ROM of the ROM 203 stores control programs and the like, which can be executed by the CPU 201. Furthermore, a font ROM of the ROM 203 stores font data (including outline font data) used upon generation of the output information and the like, and a data ROM of the ROM 203 stores information used on the host computer and the like.

The CPU 201 can execute communication processing with the host computer and another image forming apparatus on a network via a LAN controller unit 206. A RAM 202 mainly serves as a main memory, work area, and the like of the CPU 201. The RAM 202 is configured to extend a memory capacity using an option RAM (not shown) connected to an extension port. Note that the RAM 202 is used as, for example, an output information expansion area and environment data storage area. A disk controller (DKC) 208 controls accesses to the external storage device 211 such as a hard disk (HDD) or IC card. The hard disk stores application programs, font data, form data, and the like, and is used as a job storage area which is required to temporarily spool a print job and to externally control the spooled job. Furthermore, the hard disk is also used as a BOX data storage area which is required to hold image data scanned by the scanner 213 and that of a print job as BOX data, which are referred to from the network and are to be printed. In this embodiment, the HDD is used as the external storage device 211, which holds various logs such as job logs and image logs.

An operation panel 205 allows the user to input various kinds of information from software keys. The number of external storage devices 211 described above is not limited to one, but one or more external storage devices 211 may be included. Also, the external storage device 211 may be configured to connect an option font card in addition to internal fonts, and a plurality of external memories that store programs required to interpret printer control languages of different language systems. A nonvolatile memory 209 stores various kinds of setting information set from the operation panel 205.

Although not shown, to the image forming apparatus 101, various extension devices such as a finisher that executes stapling and sorting functions, and a double-sided device required to implement a double-sided print function can be connected, and their operations are controlled by the CPU 201.

FIG. 3 is a block diagram showing the hardware arrangement of the host computer 102 and print server 103 shown in FIG. 1. Referring to FIG. 3, a CPU 301 controls various devices connected to a system bus 304. A ROM 302 stores a BIOS and boot program. A RAM 303 is used as a main storage device of the CPU 301. A keyboard controller (KBC) 305 executes processing associated with inputs of information from a pointing device (PD) 309 such as a mouse® and a keyboard (KB) 310. A display controller (CRTC) 306 includes a video memory. The display controller 306 renders image data on the video memory according to an instruction from the CPU 301, and outputs the image data rendered on the video memory to a CRT (Cathode Ray Tube) display device 311 as a video signal. Note that FIG. 3 exemplifies the CRT as a display device, but the types of display devices are not particularly limited. For example, a liquid crystal display device may be used.

A disk controller (DKC) 307 controls accesses to a hard disk (HDD) 312 and floppy® disk (FD) 313. A network interface card (NIC) 308 is connected to a network, and makes information communications via the network. Note that the HDD 312 stores an OS and various application programs which run on the OS. In the above arrangement, when the power supply of the apparatus is turned on, the CPU 301 loads the OS from the HDD 312 onto the RAM 303 according to the boot program stored in the ROM 302, thus allowing the apparatus to serve as an information processing apparatus.

[Software Configuration]

Figure 4A:
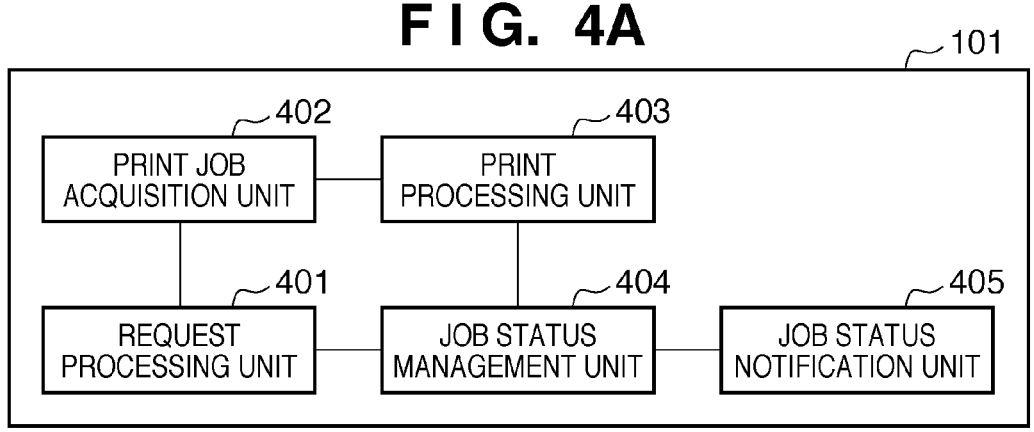
FIGS. 4A, 4B, and 4C are block diagrams showing the software configurations.

FIG. 4A is a block diagram showing the software configuration of the image forming apparatus 101. A request processing unit 401 receives a print request and print job status acquisition request from the host computer 102, and generates and returns responses according to respective processes. When the request processing unit 401 receives a print request, a print job acquisition unit 402 sends a print job acquisition request to the print server 103. After that, the print job acquisition unit 402 receives a print job, and passes it to a print processing unit 403. The print processing unit 403 analyzes the received print job to rasterize it to bitmap data, and prints the bitmap data on a paper sheet as a print medium.

A job status management unit 404 manages a status of a print job in the image forming apparatus 101. When the request processing unit 401 receives a print job status acquisition request, the job status management unit 404 returns the status of the managed print job to the request processing unit 401. When the status of the print job has changed, the job status management unit 404 notifies a job status notification unit 405 of that change. The job status notification unit 405 notifies the print server 103 of the status of the print job.

Figure 4B:
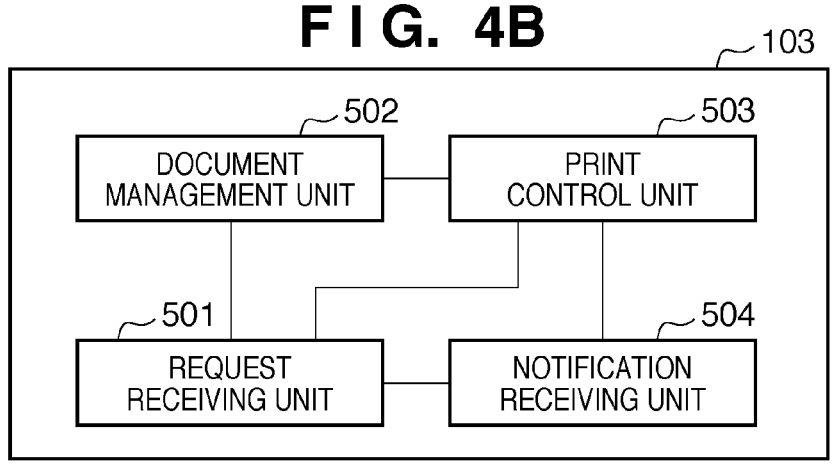

FIG. 4B is a block diagram showing the software configuration of the print server 103. A request receiving unit 501 serves as a Web server, which receives various requests from a Web browser of the host computer 102, and a print job acquisition request from the image forming apparatus 101, and generates and returns responses according to respective processes. A document management unit 502 manages documents for respective users. When a certain user accesses and logs in to the print server 103, the document management unit 502 returns a document list of that user. Also, in this case, the document management unit 502 includes a function of acquiring print statuses of respective documents from a print control unit 503, and integrating them to the document list.

When the request receiving unit 501 receives a print request from the Web browser, the print control unit 503 converts a selected document into a printable format of the image forming apparatus 101, and temporarily spools that document as a print job. After that, the print control unit 503 generates a URL (Uniform Resource Locator) required to access the spooled print job, and returns it to the request receiving unit 501. Note that the print control unit 503 need not execute the above format conversion. For example, the print control unit 503 may acquire and spool a print job which has already undergone the format conversion in another server. Furthermore, upon reception of a print job acquisition request from the image forming apparatus 101, the print control unit 503 returns the spooled print job. The print control unit 503 includes a function of managing print jobs, and holds a management table shown in FIG. 5A for this purpose. A notification receiving unit 504 receives a status notification of a print job from the image forming apparatus 101, and sends the status of the print job to the print control unit 503.

Figure 4C:
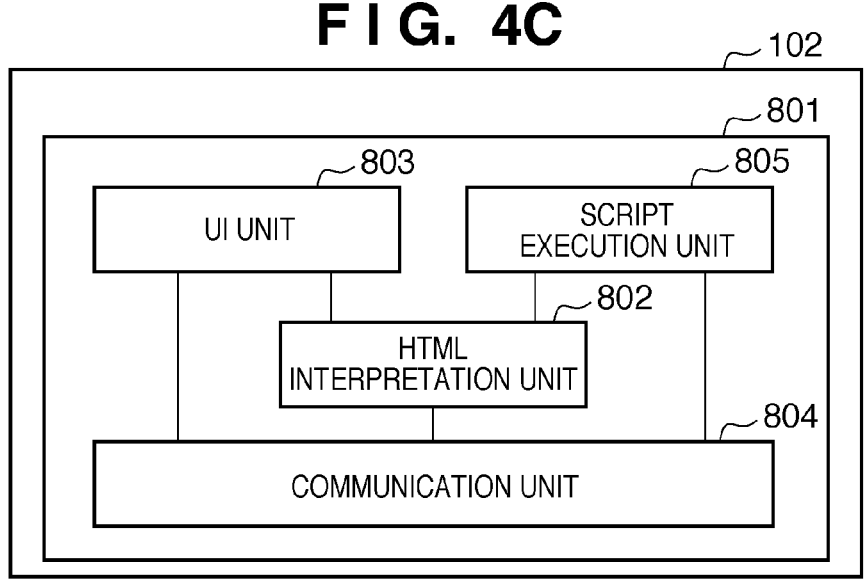

FIG. 4C is a block diagram showing the software configuration of the host computer 102. A Web browser 801 is a general Web browser application, and includes an HTML (HyperText Markup Language) interpretation unit 802, UI (User Interface) unit 803, communication unit 804, and script execution unit 805. The HTML interpretation unit 802 interprets a response which is returned from the Web server via the communication unit 804 and is described using the HTML. The UI unit 803 displays the HTML interpretation result, and accepts user's inputs. The script execution unit 805 executes a JavaScript included in the response returned from the Web server. Note that this embodiment has exemplified the JavaScript among various Script languages. However, other Script languages may be used as long as they can solve the problems of the present invention and are applicable.

FIG. 5A shows an example of a management table managed by the print control unit 503. A management table 601 holds pieces of information such as a print job ID 602, document name 603, user name 604, print status 605, and print job acquisition request reception time 606. Note that the items listed in FIG. 5A are examples, and another information required to manage a print job such as an acquisition source of document data (print data) may be added.

[Status Transition]

Figure 6:
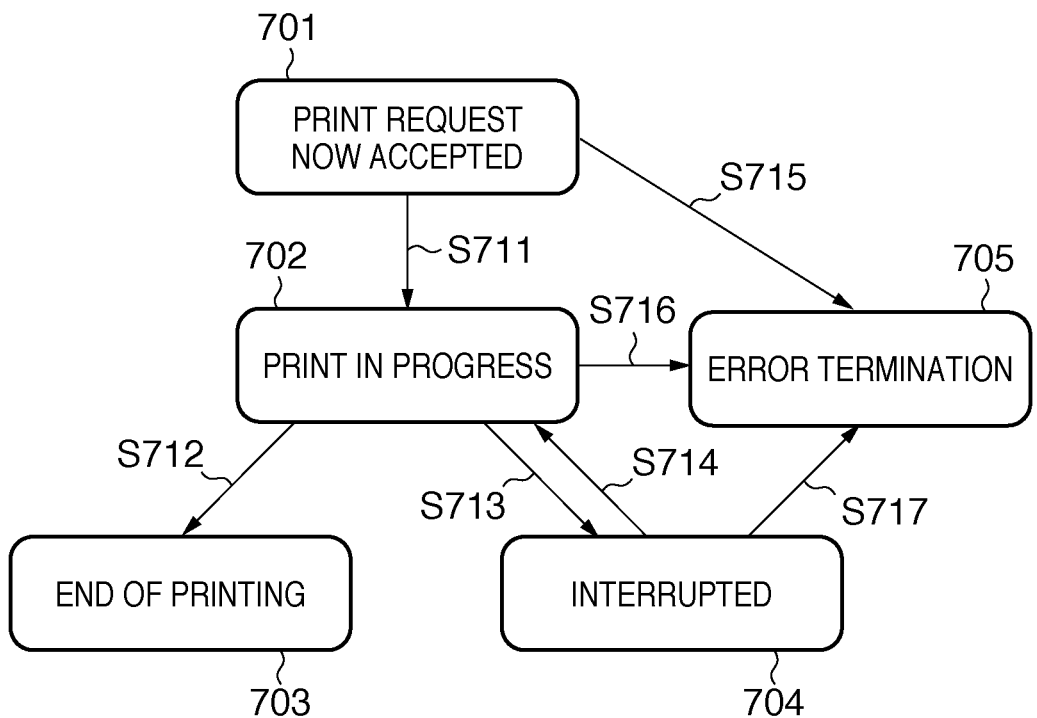
FIG. 6 is a status transition chart of a print status 605 in a management table 601.

FIG. 6 is a status transition chart of the print status 605 in the management table 601. FIG. 6 shows five print statuses, a print request now accepted 701, print in progress 702, end of printing 703, an interrupted print 704, and error termination 705. When a print request is received from the Web browser 801, a status of the print request now accepted 701 is set as an initial state. The contents of events which invoke transitions to the respective statuses will be described below.

In step S711, the print status transits when a start notification of target print job processing is received after a print job acquisition request is received from the image forming apparatus 101. In step S712, the print status transits when a print job status notification indicating that the print job is complete is received from the image forming apparatus 101. In step S713, the print status transits when a print job status notification indicating that the print job is being interrupted is received from the image forming apparatus 101. In step S714, the print status transits when a print job status notification indicating that the print job is restarted is received from the image forming apparatus 101. In step S715, the print status transits when a print job cancel request is received from the Web browser 801. In steps S716 and S717, the print status transits when a print job status notification indicating that the print job is error-terminated is received from the image forming apparatus 101, and when an error notification of the print job is received from the Web browser 801.

Figure 7:
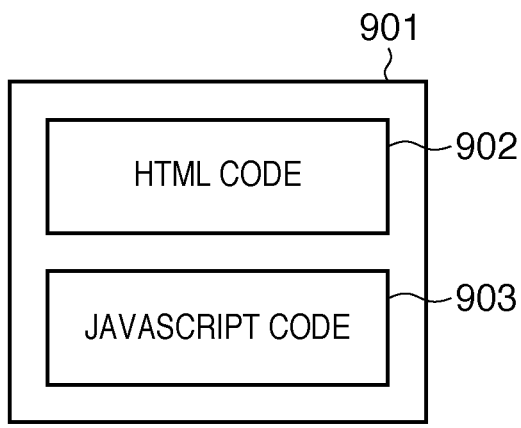
FIG. 7 is a view showing an example of a response received from a Web server by a Web browser 801.

FIG. 7 shows an example of the configuration of a response received from the Web server by the Web browser 801. A response 901 can include a JavaScript code 903 in addition to an HTML code 902 described in the HTML language. The JavaScript code 903 is described to be bounded by <script> tags.

[Print Processing]

The print execution sequence in this print job management system will be described below. Note that the following description will be given by simply describing the "Web browser 801 on the host computer 102" as the Web browser 801. Note that processing in the Web browser 801 is executed when the CPU 301 of the host computer 102 reads out its program. Also, document data to be printed will be simply described as "document". FIG. 8 shows a screen which displays a document list on the print server 103 using the Web browser 801. A document list which is accessible by a login user is displayed together with various kinds of information such as a document name 1001, date 1002, the number of pages 1003, size 1004, and print status 1005. When the user checks a check box 1006 of a desired document and presses a print button 1007, a print request (step S1105 in FIG. 9) is started, and that document can be printed. For a document, the print request of which has been started, a print status (for example, "print in progress") is displayed in the print status field 1005. When the user presses an update button 1008, a document list acquisition request (step S1201 in FIG. 10) is started, and the latest print status can be displayed.

Figure 9:
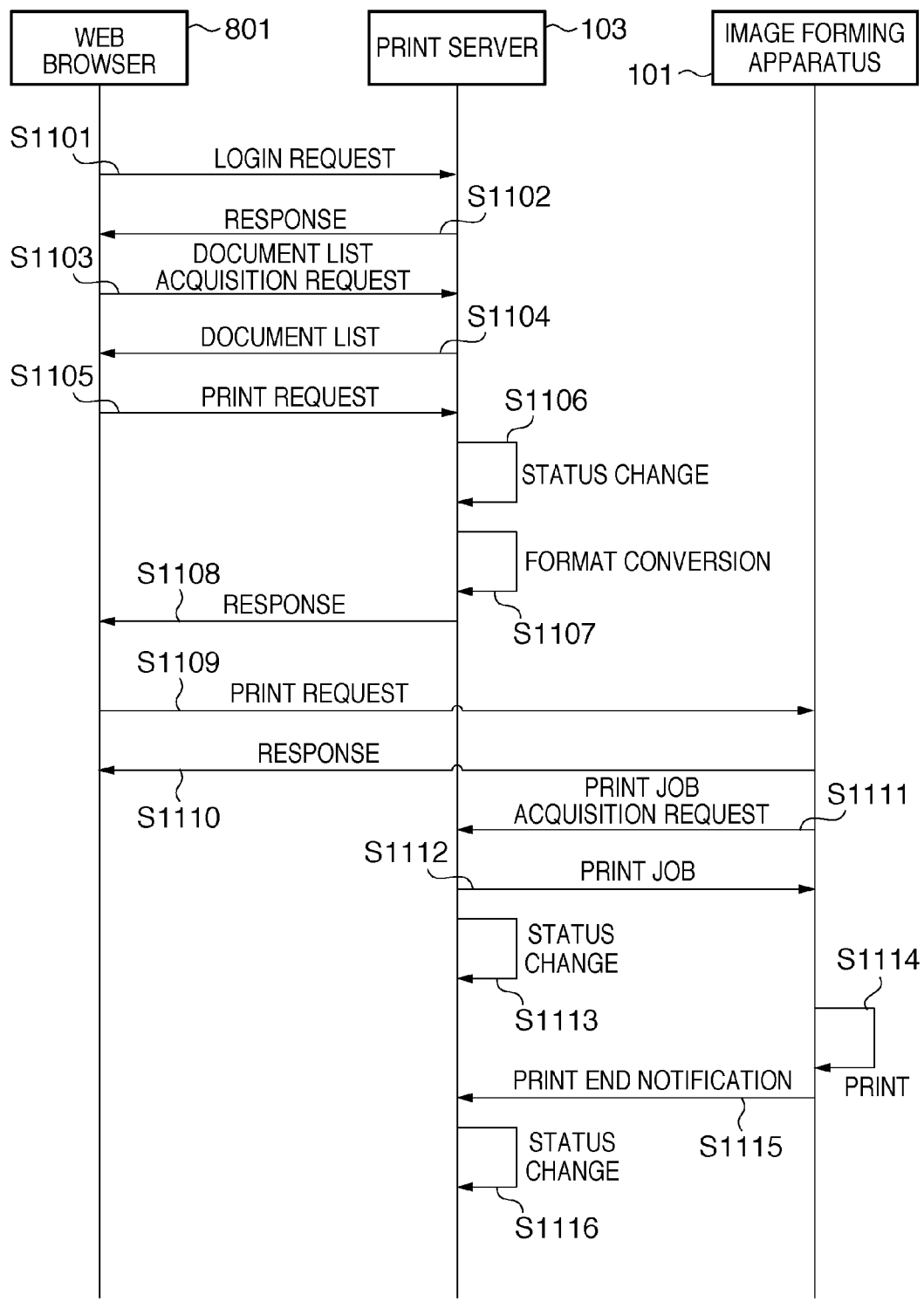
FIG. 9 is a chart of normal print processing.

FIG. 9 is a chart showing the sequence of normal print processing. A program of the image forming apparatus 101 associated with this sequence is stored in the external storage device 211 of the image forming apparatus 101. That program is read out onto the RAM 202, and is executed by the CPU 201. A program of the print server 103 is stored in the HDD 312 of the print server 103. That program is read out onto the RAM 303, and is executed by the CPU 301. A Web browser program which runs on the host computer 102 is stored in the HDD 312 of the host computer 102. That program is read out onto the RAM 303, and is executed by the CPU 301. Data acquired during processing are temporarily stored and held by the RAM 303.

The Web browser 801 accepts a user's input in step S1101, and sends a login request to the print server 103. The print server 103 returns a response in step S1102. Next, the Web browser 801 accepts a user's input in step S1103, and sends a document list acquisition request to the print server 103. Then, the print server 103 returns a document list in step S1104 in response to the document list acquisition request.

The Web browser 801 accepts a user's input in step S1105 and sends a print request of a document to the print server 103. The print server 103 changes a print status of the designated document to "print request now accepted" in step S1106. Then, the print server 103 converts the document designated in the print request into a printable format of the image forming apparatus 101, and spools it as a print job in step S1107. In step S1108, the print server 103 sends, to the Web browser 801, a response to the print request to include a JavaScript that causes the Web browser 801 to send a print request to the image forming apparatus 101. Note that this JavaScript includes a URL required for the image forming apparatus 101 to receive the print request, and a URL required for the image forming apparatus 101 to access the spooled print job. The Web browser 801 executes the received JavaScript in step S1109 to send a print request to the image forming apparatus 101. This print request includes a URL required to access the spooled print job.

The image forming apparatus 101 sends a response to the print request to the Web browser 801 in step S1110. Next, the image forming apparatus 101 sends a print job acquisition request to the print server 103 in step S1111. In response to this request, the print server 103 sends the designated print job to the image forming apparatus 101 in step S1112. In step S1113, the print server 103 changes the print status of the designated document to "print in progress", as shown in FIG. 8. At the same time, the print server 103 holds the current time as a print job acquisition request reception time in the management table 601.

The image forming apparatus 101 prints the received print job in step S1114. After that, the image forming apparatus 101 sends a job status notification indicating that the job is complete to the print server 103 in step S1115. The print server 103 changes the print status of the designated document to "end of printing" in step S1116. Note that although not shown, when the image forming apparatus 101 slides into a situation where the job is to be interrupted such as out-of-paper or paper jam during execution of the print processing, it sends a job status notification indicating that the job is interrupted to the print server 103. Upon reception of that job status notification, the print server 103 changes the print status to "interrupted".

After that, when a job interruption cause is recovered in the image forming apparatus 101, the image forming apparatus 101 sends a job status notification indicating that the print processing of the job is restarted to the print server. Upon reception of that job status notification, the print server 103 changes the print status to "print in progress". When the user cancels the print job from the operation panel 205 during execution of the print processing, the image forming apparatus 101 sends a job status notification indicating that the job is canceled to the print server 103. Upon receiving the job status notification, the print server 103 changes the print status to "error termination".

[Update Processing]

Figure 10:
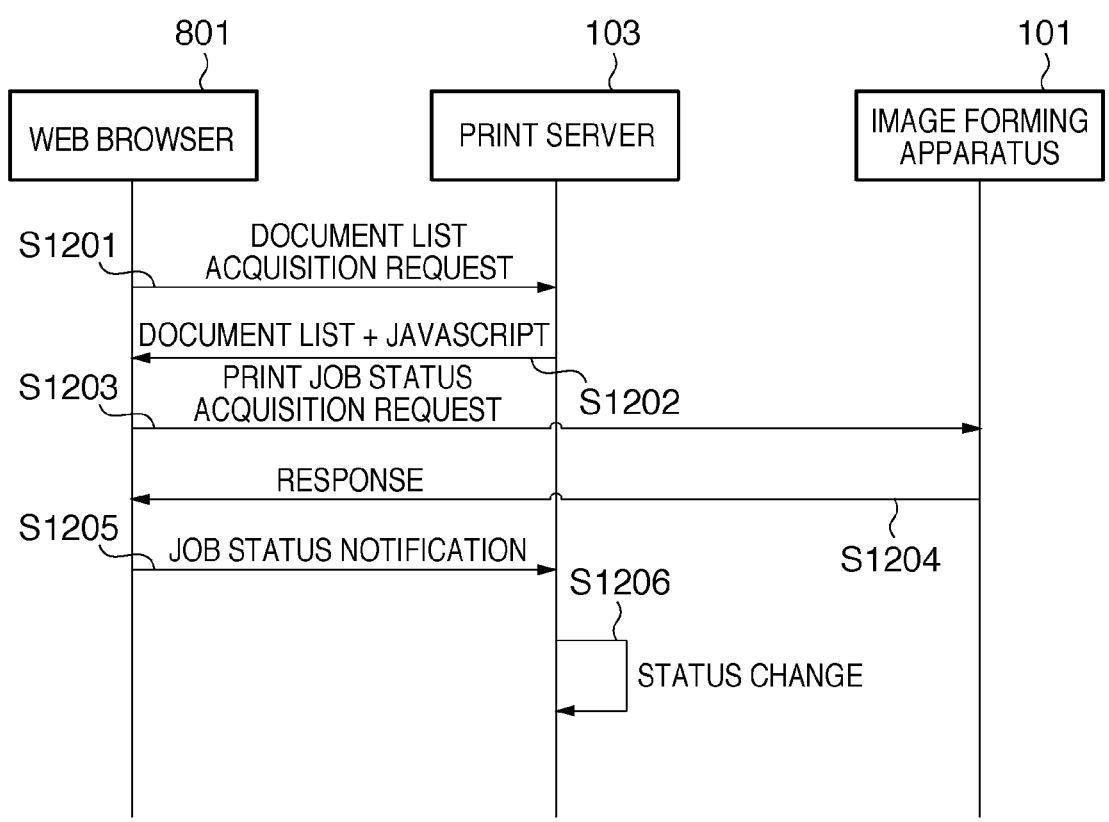
FIG. 10 is a chart of document list display update processing according to the first embodiment.

Next, the sequence executed when the Web browser 801 updates the displayed contents of the document list after execution of the print processing will be described below. FIG. 10 is a chart of the document list display update sequence. A program of the image forming apparatus 101 associated with this sequence is stored in the external storage device 211 of the image forming apparatus 101. That program is read out onto the RAM 202, and is executed by the CPU 201. A program of the print server 103 is stored in the HDD 312 of the print server 103. That program is read out onto the RAM 303, and is executed by the CPU 301. A Web browser program which runs on the host computer 102 is stored in the HDD 312 of the host computer 102. That program is read out onto the RAM 303, and is executed by the CPU 301.

The Web browser 801 accepts a user's display update input in step S1201 to send a document list acquisition request to the print server 103. In step S1202, the print server 103 generates a response including a JavaScript which causes the Web browser 801 to send a print job status acquisition request to the image processing apparatus 101 in addition to normal document list information. The processing defined by this JavaScript implements a command that causes the host computer 102 (Web browser 801) to acquire a status of the print job from the image forming apparatus 101. Then, the print server 103 sends the response to the document list acquisition request from the Web browser 801. Note that whether or not the response includes the JavaScript as the command is determined based on a determination sequence to be described later.

The Web browser 801 executes the received JavaScript in step S1203 to send a print job status acquisition request to the image forming apparatus 101. The image forming apparatus 101 returns a list including the status of the print job in the image forming apparatus 101 as a response to the print job status acquisition request from the Web browser 801 in step S1204. In this case, for example, when the image forming apparatus 101 has been turned on/off, and there is no print job at the reception timing of the print job status acquisition request, an empty list is returned. After that, the Web browser 801 sends the status of the print job acquired from the image forming apparatus 101 to the print server 103 in step S1205. The print server 103 updates the status of the managed print job according to the status of the print job received from the Web browser 801 in step S1206.

[Document List Acquisition Processing]

Figure 12:
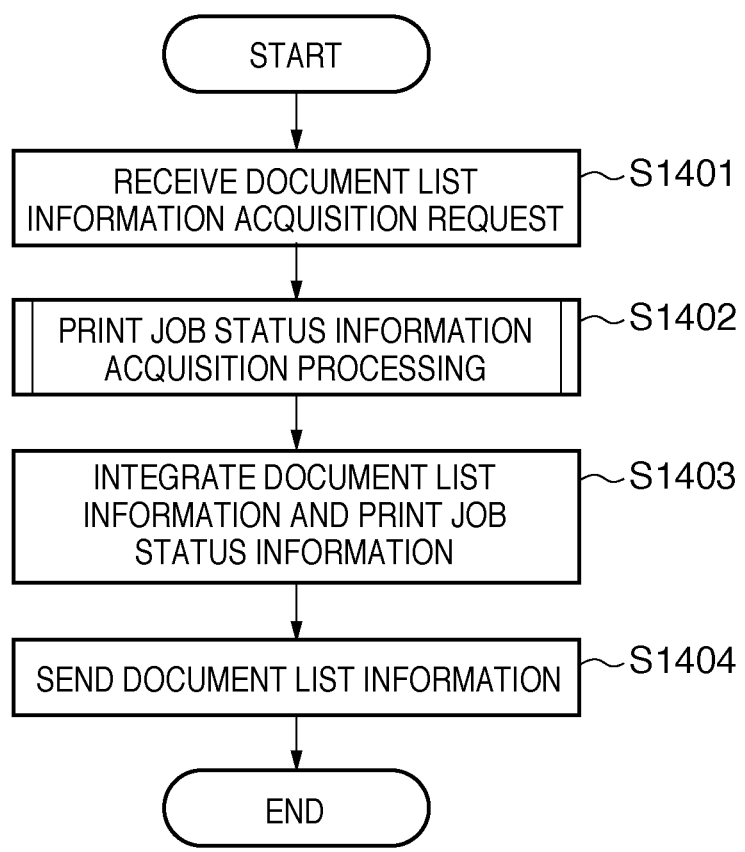
FIG. 12 is a flowchart of document list information acquisition request receiving processing according to the first embodiment.
Figure 13:
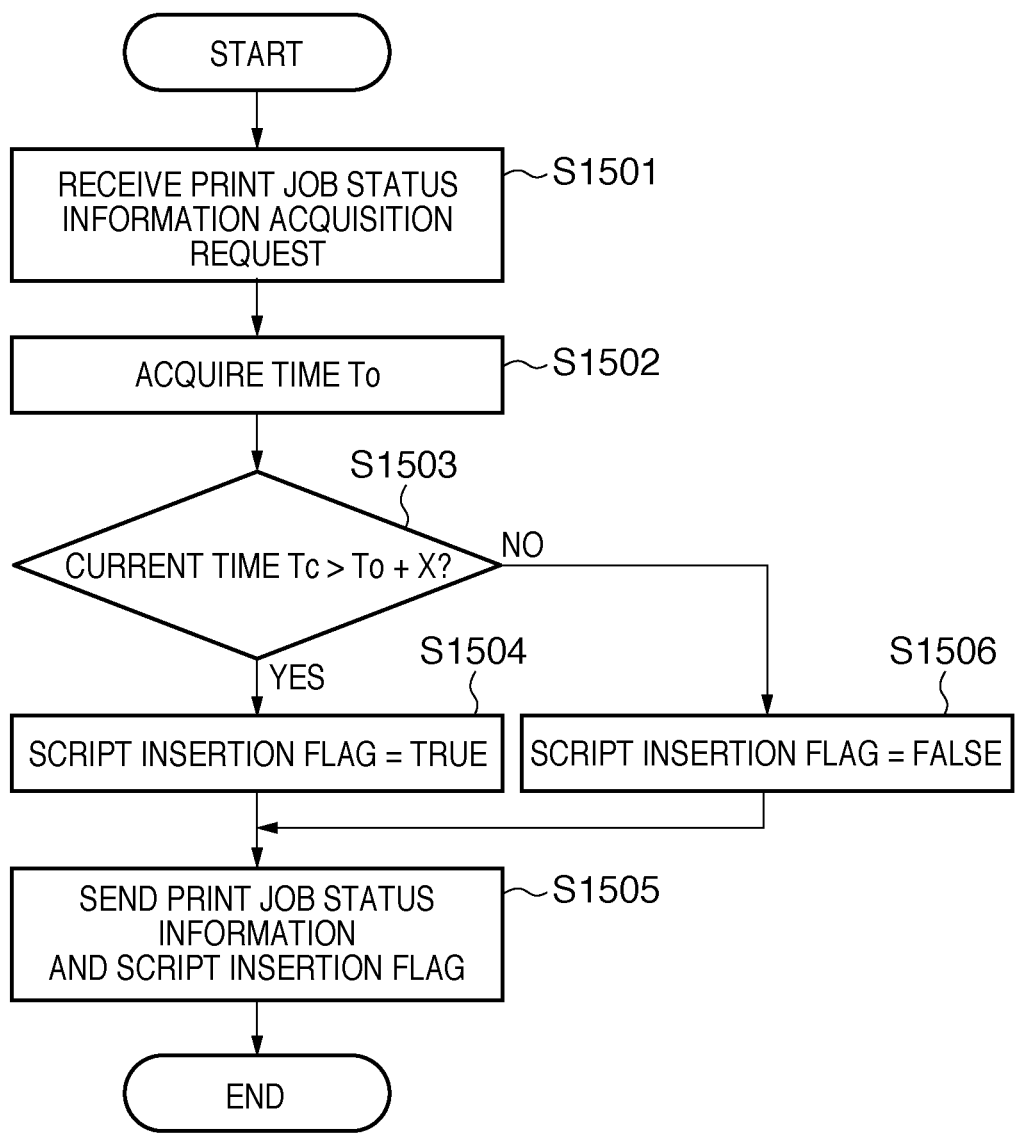
FIG. 13 is a flowchart of print job status information acquisition request receiving processing according to the first embodiment.

Next, processing executed when the print server 103 receives a document list acquisition request from the Web browser 801 will be described in detail below with reference to the flowcharts shown in FIGS. 11 to 13. That is, the flowcharts shown in FIGS. 11 to 13 show processes to be executed by the print server 103 in steps S1103 and S1104 shown in FIG. 9 and steps S1201 and S1202 shown in FIG. 10.

Figure 11:
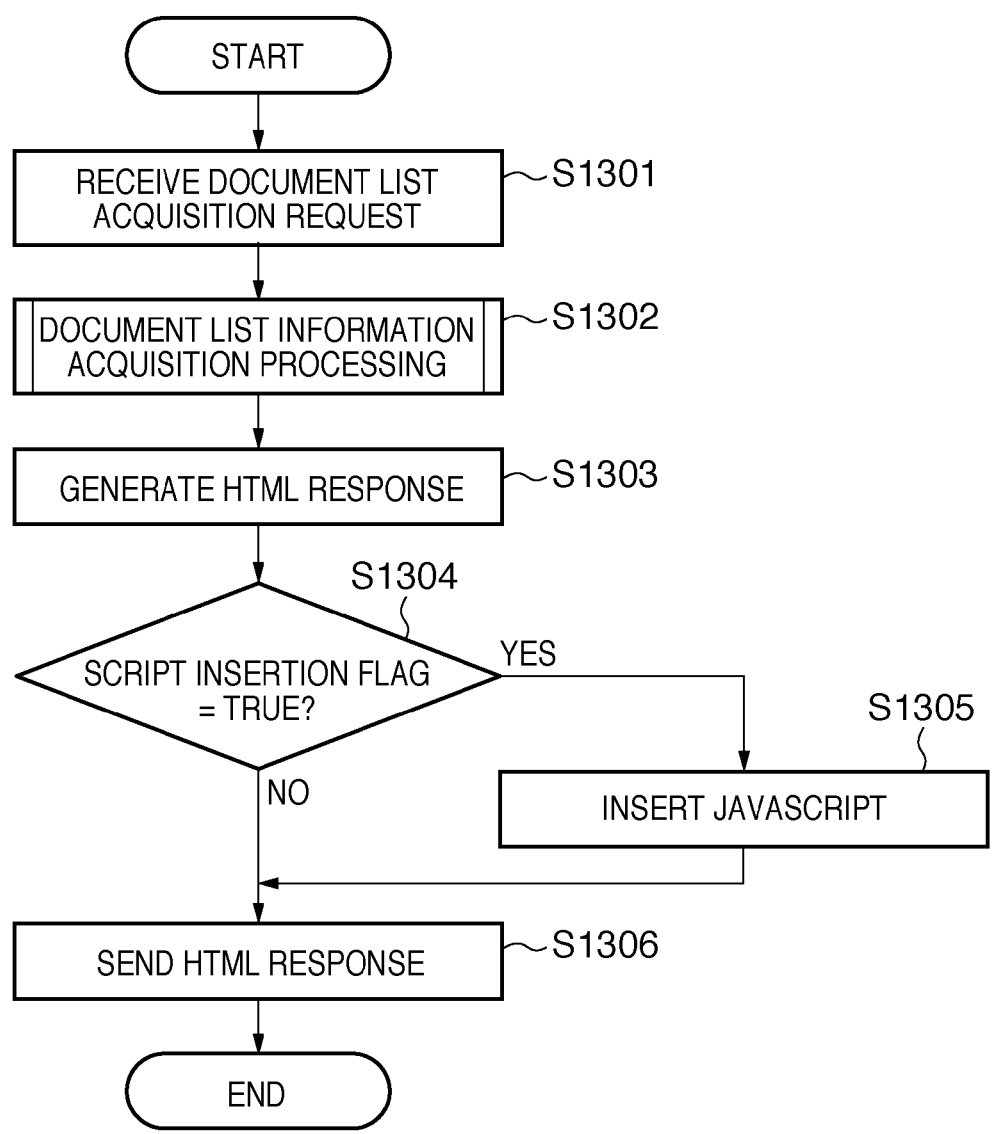
FIG. 11 is a flowchart of document list acquisition request receiving processing according to the first embodiment.

FIG. 11 is a flowchart showing processing executed when the request receiving unit 501 of the print server 103 receives a document acquisition request from the Web browser 801. A program of the request receiving unit 501 associated with this sequence is stored in the HDD 312 of the print server 103. That program is read out onto the RAM 303, and is executed by the CPU 301.

In step S1301, the request receiving unit 501 of the print server 103 receives a document list acquisition request from the Web browser 801. In step S1302, the request receiving unit 501 notifies the document management unit 502 of a document list information acquisition request by designating the login user name, thus acquiring document list information of that user. The document list information acquisition processing in this step will be described later using FIG. 12. In this case, a script insertion flag is also returned together with the document list information. The script insertion flag is information used to designate whether or not to set an HTML response to include a JavaScript, and is set by the print control unit 503. Processing of the print control unit 503 will be described later.

In step S1303, the request receiving unit 501 generates an HTML response based on the document list information acquired from the document management unit 502. In step S1304, the request receiving unit 501 checks True/False set in the script insertion flag returned as a response. If the script insertion flag is "True" (YES in step S1304), the process advances to step S1305. Then, the request receiving unit 501 generates the aforementioned JavaScript, and inserts it in the HTML response. After that, in step S1306, the request receiving unit 501 sends the generated HTML response to the Web browser 801, thus ending the processing. If it is determined in step S1304 that the script insertion flag is "False" (NO in step S1304), the request receiving unit 501 sends the generated HTML response to the Web browser 801 in step S1306, thus ending the processing.

FIG. 12 is a flowchart showing processing executed when the document management unit 502 of the print server 103 receives the document list information acquisition request from the request receiving unit 501. More specifically, this processing corresponds to the document list information acquisition processing shown in step S1302 of FIG. 11. A program of the document management unit 502 associated with this processing sequence is stored in the HDD 312 of the print server 103. That program is read out onto the RAM 303, and is executed by the CPU 301.

In step S1401, the document management unit 502 receives the document list information acquisition request from the request receiving unit 501. In step S1402, the document management unit 502 notifies the print control unit 503 of a print job status information acquisition request by designating the user name notified from the request receiving unit 501, thus acquiring print job status information of that user. In this case, a script insertion flag to be described later is also returned together with the print job status information. The print job status information acquisition processing in this step will be described in detail later using FIG. 13. In step S1403, the document management unit 502 integrates the managed document list information and the print job status information returned from the print control unit 503. In step S1404, the document management unit 502 sends the integrated document list information and the script insertion flag to the request receiving unit 501, thus ending the processing.

FIG. 13 is a flowchart showing processing executed when the print control unit 503 of the print server 103 receives the print job status information acquisition request from the document management unit 502. More specifically, this processing corresponds to the print job status information acquisition processing shown in step S1402 of FIG. 12. A program of the print control unit 503 associated with this sequence is stored in the HDD 312 of the print server 103. That program is read out onto the RAM 303, and is executed by the CPU 301.

In step S1501, the print control unit 503 receives the print job status information acquisition request from the document management unit 502. In step S1502, the print control unit 503 acquires an oldest reception time To of the print job status information acquisition request from print jobs of the user name notified from the document management unit 502. Then, the print control unit 503 checks in step S1503 whether or not a current time Tc is a time after an elapse of a job condition confirmation time period X since To. In this case, the job condition confirmation time period X assumes a fixed value (predetermined time period) such as 5 min, which value is defined in advance, but an administrator may freely set this time period to be a value equal to or larger than 0. If the checking result in step S1503 is YES, the print control unit 503 sets the script insertion flag="True" in step S1504, and the process advances to step S1505. If the checking result in step S1503 is NO, the print control unit 503 sets the script insertion flag="False" in step S1506, and the process advances to step S1505. In step S1505, the print control unit 503 sends the print job status information of the designated user and the script insertion flag to the document management unit 502, thus ending the processing.

Note that the script insertion flag used in this processing sequence may be reset upon reception of the document list acquisition request in, for example, step S1301 of FIG. 11.

[Script Execution Processing]

Figure 14:
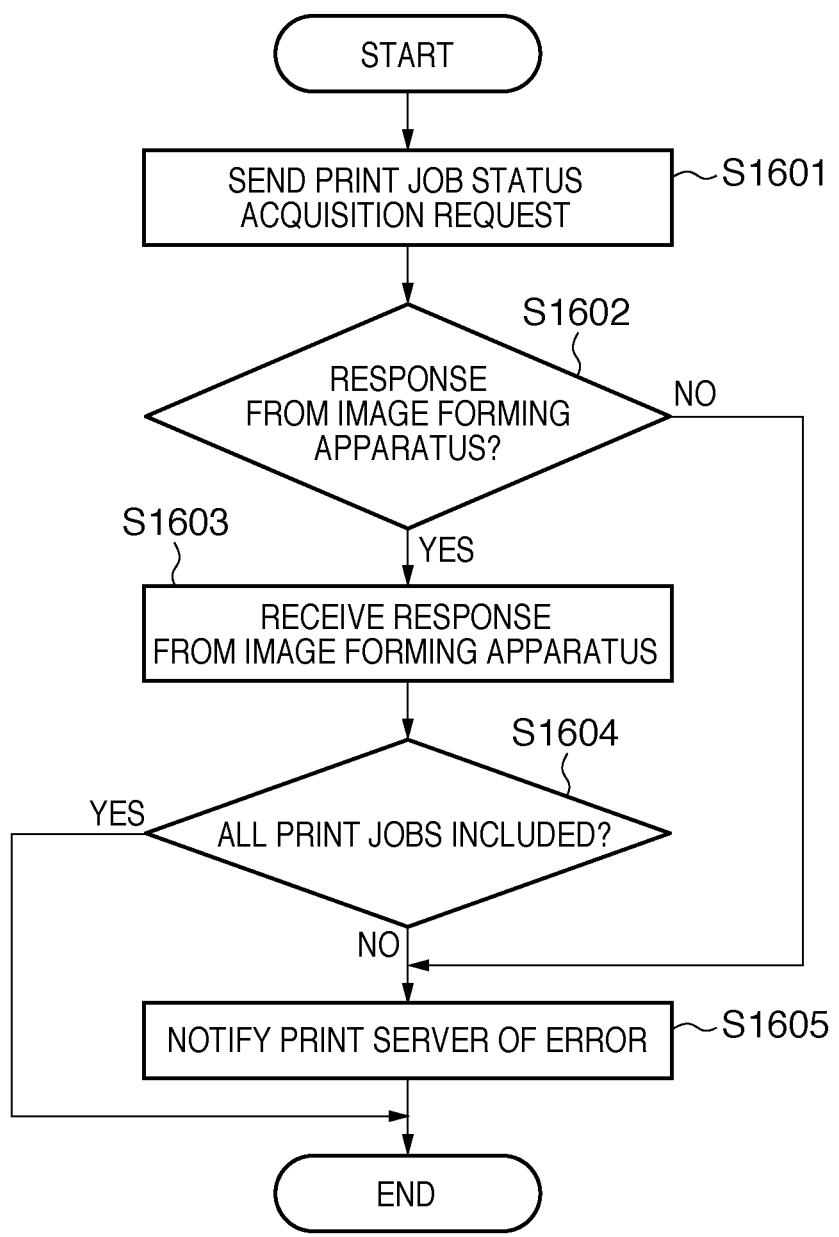
FIG. 14 is a flowchart of JavaScript processing according to the first embodiment.

Processing executed when the Web browser 801 executes the JavaScript received from the print server 103 will be described below with reference to FIG. 14 and FIGS. 15A to 15C. FIG. 14 is a flowchart showing processing of the JavaScript to be executed by the Web browser 801. This flowchart corresponds to processing executed by the Web browser 801 in steps S1203 to S1205 shown in FIG. 10. Note that FIGS. 15A to 15C show description examples of a request/response exchanged between the apparatuses, but the present invention is not limited to these description contents. A program to be executed by the Web browser 801 associated with this sequence is returned from the print server 103 as the JavaScript, and is expanded on the RAM 303 of the host computer 102. After that, this program is executed by the CPU 301.

In step S1601, the Web browser 801 sends a print job status acquisition request to the image forming apparatus 101. FIG. 15A shows a description example of the print job status acquisition request. The Web browser 801 checks in step S1602 whether or not a response is returned from the image forming apparatus 101. Normally, a response is always returned from the image forming apparatus 101. However, for example, when the power supply of the image forming apparatus 101 is OFF, no response is returned. If it is determined in step S1602 that a response is returned (YES in step S1602), the process advances to step S1603, and the Web browser 801 receives the response from the image forming apparatus 101.

FIG. 15B shows a description example of the response. The Web browser 801 checks in step S1604 whether or not all print jobs returned from the print server 103 are included in the response returned from the image forming apparatus 101. If it is determined in step S1604 that all the print jobs are included (YES in step S1604), the Web browser 801 ends the processing of the JavaScript. That is, since processes for all the print jobs are in progress in the image forming apparatus, the Web browser 801 does not send any notification to the print server 103. If it is determined in step S1604 that a print job which is not included in the response is found (NO in step S1604), the process advances to step S1605, and the Web browser 801 sends an error notification of the print job which is not included in the response to the print server 103, thus ending the processing of the JavaScript. FIG. 15C shows a description example of the error notification. If it is determined in step S1602 that no response is returned from the image forming apparatus 101 (NO in step S1602), the process jumps to step S1605. In this case, it is recognized that all print jobs are not included in a response, and the Web browser 801 executes error notification processing for all the print jobs in step S1605, thus ending the processing based on the JavaScript.

[Description Example of Request/Response]

FIG. 15A shows an example of the print job status acquisition request sent in step S1601 in the flowchart of FIG. 14. The print job status acquisition request is described in an XML (eXtensible Markup Language) format. Note that FIG. 15A does not describe headers of HTTP and SOAP (Simple Object Access Protocol) commonly used as Web services for the sake of simplicity.

FIG. 15B shows an example of the response which is returned from the image forming apparatus 101 to the Web browser 801 in step S1603 in the flowchart of FIG. 14. FIG. 15B describes only a necessary part in the XML format as in FIG. 15A. In <Jobs> tags, pieces of information jobs, which are currently processed by the image forming apparatus 101, are described. When no <Job> tag appears in the response, it indicates that there is no job currently processed by the image forming apparatus 101.

FIG. 15C shows an example of the error notification sent in step S1605 in the flowchart of FIG. 14. FIG. 15C describes only a necessary part in the XML format as in FIG. 15A. In <Jobs> tags, information of a job determined as an error is described.

Note that this embodiment adopts the configuration in which the single print server 103 operates, but may adopt a configuration in which a plurality of print servers execute clustering to distribute a load.

As described above, according to the present invention, even in a situation in which the image forming apparatus itself cannot notify the print server of a status of a print job due to, for example, suspension of the image forming apparatus, the print server can mange that job status.

<Second Embodiment>

The second embodiment will be described below. In the first embodiment, a time period required until it is determined that a print server 103 generates an HTML response including a JavaScript as that to a document list acquisition request received from a Web browser 801 is fixed. In this embodiment, the print server 103 executes control for changing that time period to assume an appropriate value for each print job. With this control, a long time period is set for a print job which has a large size and requires a long period of time until completion of print processing, thus reducing wasted inquiries to an image forming apparatus. Note that a description about the same parts as in the first embodiment will not be repeated in this embodiment, and only differences will be described.

FIG. 5B shows an example of a management table managed by a print control unit 503. A management table 2001 of this embodiment holds information of a print predicted time period 2002 for each print job. This print predicted time period 2002 is calculated based on information such as a size, the number of pages, PDL type, and the like of a print job when the print control unit 503 receives a print request and converts it into a printable format of an image forming apparatus 101. Using this print predicted time period, an end predicted time for that print job is predicted. Assume that pieces of information used in the calculation of the print predicted time period in this case are defined in advance.

Figure 16:
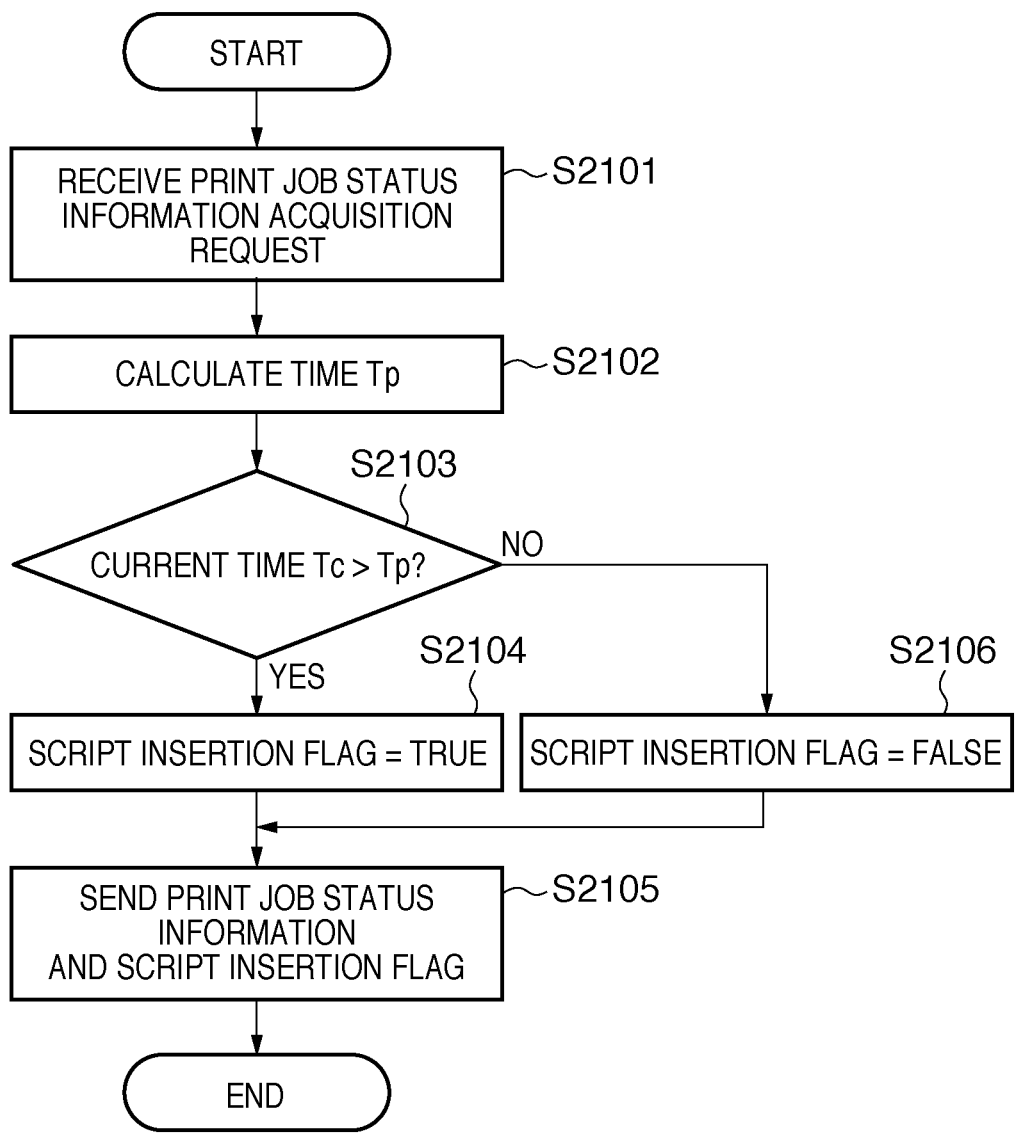
FIG. 16 is a flowchart of print job status information acquisition request receiving processing according to the second embodiment.

FIG. 16 is a flowchart showing processing executed when the print control unit 503 of the print server 103 receives a print job status information acquisition request from a document management unit 502. A program of the print control unit 503 associated with this sequence is stored in an HDD 312 of the print server 103. This program is read out onto a RAM 303, and is executed by a CPU 301. Note that this processing sequence corresponds to the processing of FIG. 13 described in the first embodiment, and is executed in place of that processing.

In step S2101, the print control unit 503 receives the print job status information acquisition request from the document management unit 502. In step S2102, the print control unit 503 extracts a print job having an oldest time corresponding to (print job acquisition request reception time+print predicted time period) from print jobs of a user name notified from the document management unit 502, and sets the calculated time as Tp. The print control unit 503 checks in step S2103 whether or not a current time Tc is a time after an elapse of this Tp. If the checking result in step S2103 is YES, the print control unit 503 sets a script insertion flag="True" in step S2104, and the process advances to step S2105. If the checking result in step S2103 is NO, the print control unit 503 sets the script insertion flag="False" in step S2106, and the process advances to step S2105. In step S2105, the print control unit 503 sends print job status information of the designated user and the script insertion flag to the document management unit 502, thus ending the processing.

According to this embodiment, wasted inquiries to the image forming apparatus can be reduced in addition to the effects of the first embodiment.

<Third Embodiment>

The third embodiment will be described below. In the first and second embodiments, a Web browser 801 sends a notification (error notification) to a print server 103 when a certain problem has occurred (for example, a print job is detected after the Web browser 801 acquires a print job status from an image forming apparatus 101).

In this embodiment, the Web browser 801 sends a notification to the print server 103 even when a print job status acquired from the image forming apparatus has no problem. Then, when the print server 103 receives the next document list acquisition request, it resets a time period required until it is determined that an HTML response is generated to include a JavaScript. Thus, when a print job of a given user is queued for a simple reason that the image forming apparatus is used by a large-size print job of another user, wasted inquiries from the print server to the image forming apparatus can be reduced. Note that a description about the same parts as in the first embodiment will not be repeated in this embodiment, and only differences will be described.

FIG. 5C shows an example of a management table managed by a print control unit 503. A management table 2201 of this embodiment holds information of a print status last update time 2202 for each print job. Every time a print job status notification is received from the Web browser 801, this print status last update time 2202 is updated at that time.

Figure 17:
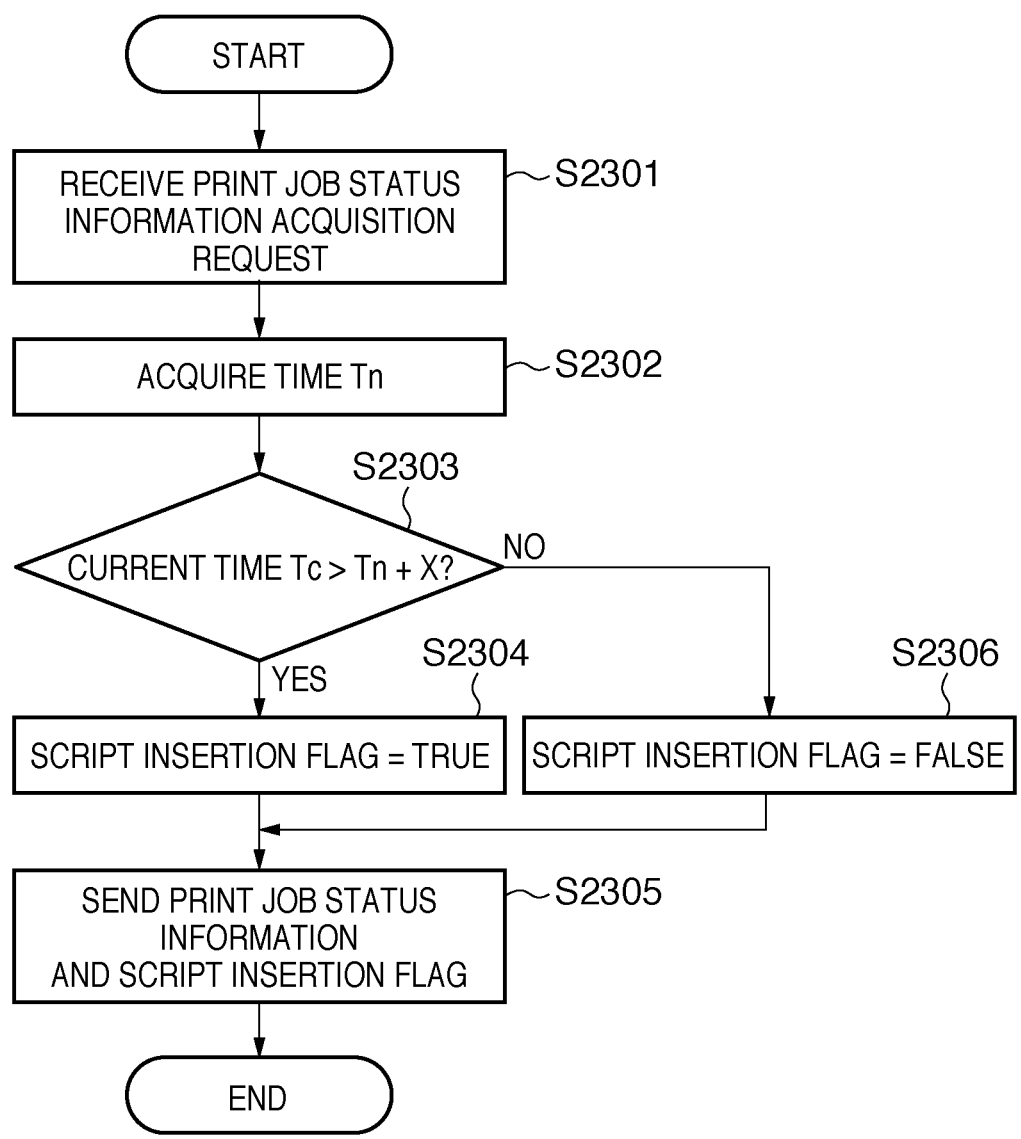
FIG. 17 is a flowchart of print job status information acquisition request receiving processing according to the third embodiment.

FIG. 17 is a flowchart showing processing executed when the print control unit 503 of a print server 103 receives a print job status information acquisition request from a document management unit 502. A program of the print control unit 503 associated with this sequence is stored in an HDD 312 of the print server 103. This program is read out onto a RAM 303, and is executed by a CPU 301. Note that this processing sequence replaces that shown in FIG. 13 described in the first embodiment and that shown in FIG. 16 described in the second embodiment.

In step S2301, the print control unit 503 of the print server 103 receives a print job status information acquisition request from the document management unit 502. In step S2302, the print control unit 503 acquires a time Tn of a print job whose print status last update time 2202 is oldest from print jobs of a user name notified from the document management unit 502. The print control unit 503 then checks in step S2303 whether or not a current time Tc is a time after an elapse of a time (T+X) obtained by adding a job condition confirmation time period X to Tn. In this case, the job condition confirmation time period X assumes a fixed value (predetermined time period) such as 5 min, but an administrator may freely set this time period to be a value equal to or larger than 0. Therefore, this job condition confirmation time period X can be set in consideration of, for example, a processing load.

If the checking result in step S2303 is YES, the print control unit 503 sets a script insertion flag="True" in step S2304, and the process advances to step S2305. If the checking result in step S2303 is NO, the print control unit 503 sets the script insertion flag="False" in step S2306, and the process advances to step S2305. In step S2305, the print control unit 503 sends print job status information of the designated user and the script insertion flag to the document management unit 502, thus ending the processing.

[Script Execution Processing]

Figure 18:
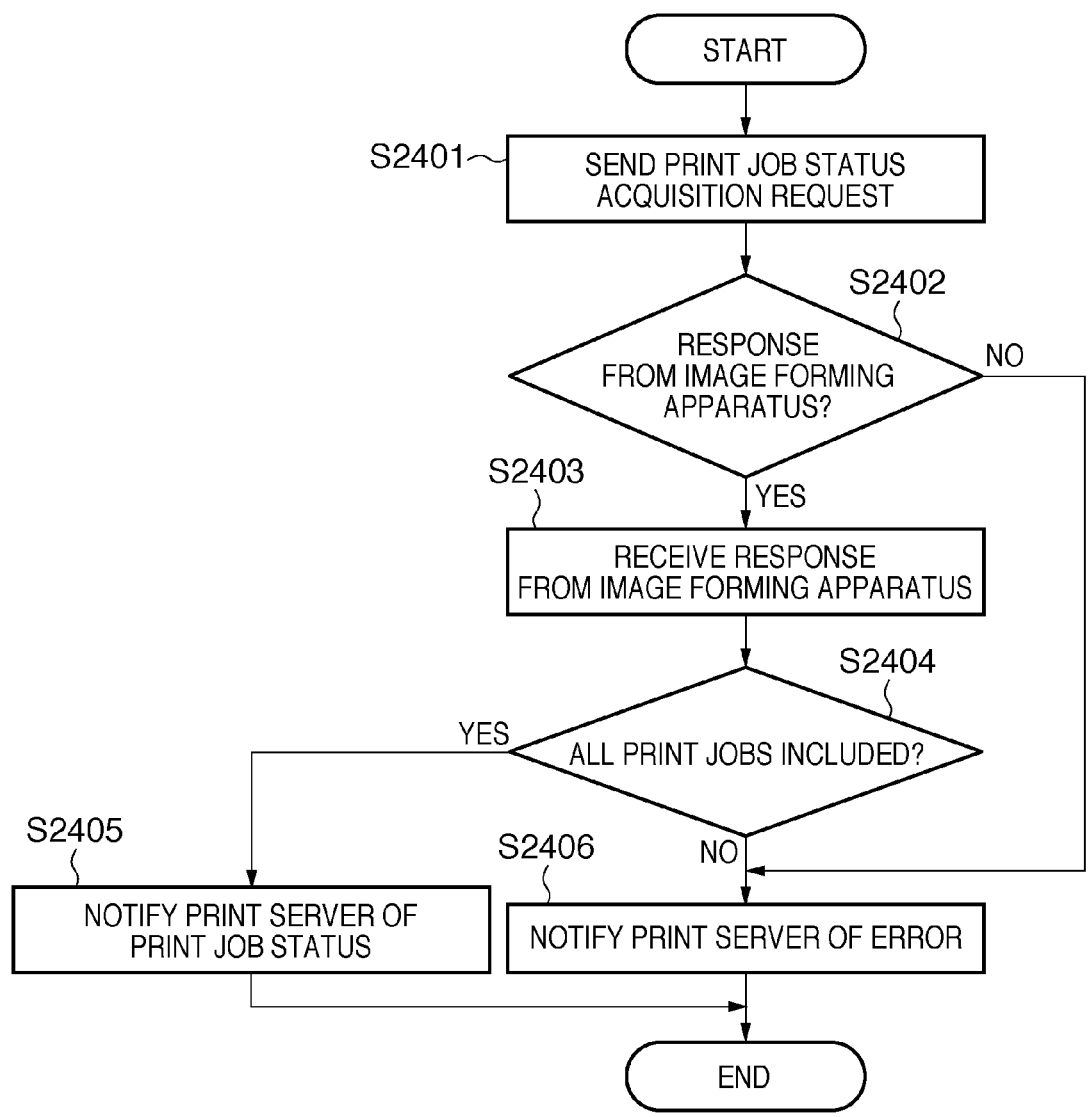
FIG. 18 is a flowchart of JavaScript processing according to the third embodiment.

Processing executed when the Web browser 801 executes a JavaScript received from the print server 103 will be described below with reference to FIGS. 15D and 18. FIG. 18 is a flowchart showing processing of the JavaScript to be executed by the Web browser 801. A program to be executed by the Web browser 801 associated with this sequence is returned from the print server 103 as the JavaScript, and is expanded on the RAM 303 of a host computer 102. After that, this program is executed by the CPU 301. Note that this processing sequence corresponds to that shown in FIG. 14 described in the first embodiment, and replaces that processing.

In step S2401, the Web browser 801 sends a print job status acquisition request to an image forming apparatus 101. The print job status acquisition request in this case is the same as that shown in FIG. 15A described in the first embodiment. The Web browser 801 checks in step S2402 whether or not a response is returned from the image forming apparatus 101. Normally, a response is always returned from the image forming apparatus 101. However, for example, when the power supply of the image forming apparatus 101 is OFF, no response is returned. If it is determined in step S2402 that a response is returned (YES in step S2402), the process advances to step S2403, and the Web browser 801 receives the response from the image forming apparatus 101. The response in this case is the same as that shown in FIG. 15B described in the first embodiment.

The Web browser 801 checks in step S2404 whether or not all print jobs returned from the print server 103 are included in the response returned from the image forming apparatus 101. If it is determined in step S2404 that all the print jobs are included (YES in step S2404), the process advances to step S2405, and the Web browser 801 sends a print job status notification to the print server 103, thus ending the processing of the JavaScript. FIG. 15D shows a description example of the print job status notification sent in this step. If it is determined in step S2404 that a print job which is not included in the response is found (NO in step S2404), the process advances to step S2406, and the Web browser 801 sends an error notification of the print job which is not included in the response to the print server 103, thus ending the processing of the JavaScript. The error notification of the print job sent in this case is the same as that shown in FIG. 15C described in the first embodiment. If it is determined in step S2402 that no response is returned from the image forming apparatus 101, the process jumps to step S2406. In this case, it is recognized that all print jobs are not included in a response, and the Web browser 801 sends an error notification for all the print jobs, thus ending the processing based on the JavaScript.

FIG. 15D shows an example of the print job status notification sent in step S2405 in the flowchart of FIG. 18. FIG. 15D describes only a necessary part in the XML format as in FIG. 15A for the sake of simplicity. In <Jobs> tags, information of a print job currently processed by the image forming apparatus 101 is described.

As described above, according to this embodiment, when a print job is queued for a simple reason that the image forming apparatus is used by large quantities of print job of another user, wasted inquiries from the print server to the image forming apparatus can be reduced in addition to the effects of the first embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191393, filed Aug. 27, 2010, which is hereby incorporated by reference herein in its entirety.

What is claimed is:

1. A print job management system including an information processing apparatus, a print server, and an image forming apparatus, wherein
said print server comprises:
a management unit configured to receive a print request from said information processing apparatus, and to manage a status of a print job to be executed by said image forming apparatus in response to the print request;
a request receiving unit configured to receive the print request from said information processing apparatus, and to return a response to the print request,
wherein said request receiving unit returns the response including a command which controls said information processing apparatus to send a status acquisition request of a print job to said image forming apparatus, and
said management unit updates a status of the managed print job in accordance with a status of the print job received from said information processing apparatus, and
wherein said information processing apparatus comprises:
a sending unit configured to send the print request to said print server;
a request unit configured to send the status acquisition request of the print job to said image forming apparatus in accordance with the command included in the response from said print server to the print request sent by said sending unit; and
a notification unit configured to notify said print server of a status of the print job returned from said image forming apparatus as a response to the status acquisition request of the print job sent by said request unit,
wherein said management unit of said print server determines whether or not a predetermined time period has elapsed since the beginning of processing for a print job, and
when the predetermined time period has elapsed, said request receiving unit of said print server returns the response including the command to said information processing apparatus.

2. A print job management system including an information processing apparatus, a print server, and an image forming apparatus, wherein
said print server comprises:
a management unit configured to receive a print request from said information processing apparatus, and to manage a status of a print job to be executed by said image forming apparatus in response to the print request; and
a request receiving unit configured to receive the print request from said information processing apparatus, and to return a response to the print request,
wherein said request receiving unit returns the response including a command which controls said information processing apparatus to send a status acquisition request of a print job to said image forming apparatus, and
said management unit updates a status of the managed print job in accordance with a status of the print job received from said information processing apparatus, and
wherein said information processing apparatus comprises:
a sending unit configured to send the print request to said print server;
a request unit configured to send the status acquisition request of the print job to said image forming apparatus in accordance with the command included in the response from said print server to the print request sent by said sending unit; and
a notification unit configured to notify said print server of a status of the print job returned from said image forming apparatus as a response to the status acquisition request of the print job sent by said request unit,
wherein said management unit of said print server determines whether or not an end predicted time of processing for a print job has elapsed, and
when the end predicted time has elapsed, said request receiving unit of said print server returns the response including the command to said information processing apparatus.

3. A print job management system including an information processing apparatus, a print server, and an image forming apparatus, wherein
said print server comprises:
a management unit configured to receive a print request from said information processing apparatus, and to manage a status of a print job to be executed by said image forming apparatus in response to the print request; and
a request receiving unit configured to receive the print request from said information processing apparatus, and to return a response to the print request,
wherein said request receiving unit returns the response including a command which controls said information processing apparatus to send a status acquisition request of a print job to said image forming apparatus, and wherein said management unit updates a status of the managed print job in accordance with a status of the print job received from said information processing apparatus, and said information processing apparatus comprises:
a sending unit configured to send the print request to said print server;
a request unit configured to send the status acquisition request of the print job to said image forming apparatus in accordance with the command included in the response from said print server to the print request sent by said sending unit; and
a notification unit configured to notify said print server of a status of the print job returned from said image forming apparatus as a response to the status acquisition request of the print job sent by said request unit,
wherein said management unit of said print server determines whether or not a predetermined time period has elapsed since a reception time of a status of a print job from said information processing apparatus, and
when the predetermined time period has elapsed, said request receiving unit of said print server returns the response including the command to said information processing apparatus.

4. The system according to one of claims 1 to 3, wherein said notification unit of said information processing apparatus notifies said print server of a status of the print job according to the status of the print job returned from said image forming apparatus.

5. A control method in a print job management system including an information processing apparatus, a print server, and an image forming apparatus, comprising:
in the print server,
a management step of receiving a print request from the information processing apparatus, and to manage a status of a print job to be executed by the image forming apparatus in response to the print request; and
a request receiving step of receiving the print request from the information processing apparatus, and returning a response to the print request, and
wherein, in the request receiving step, the response including a command which controls the information processing apparatus to send a status acquisition request of a print job to the image forming apparatus being returned to the information processing apparatus, and
in the management step, a status of the managed print job being updated in accordance with a status of the print job received from the information processing apparatus; and
in the information processing apparatus,
a sending step of sending the print request to the print server;
a request step of sending the status acquisition request of the print job to the image forming apparatus in accordance with the command included in the response from the print server to the print request sent in the sending step; and
a notification step of notifying the print server of a status of the print job returned from the image forming apparatus as a response to the status acquisition request of the print job sent in the request step,
wherein in the management step in said print server, it is determined whether or not a predetermined time period has elapsed since the beginning of processing for a print job, and
when the predetermined time period has elapsed, in the request receiving step in said print server, the response including the command is returned to said information processing apparatus.

6. A control method in a print job management system including an information processing apparatus, a print server, and an image forming apparatus, comprising:
in the print server,
a management step of receiving a print request from the information processing apparatus, and to manage a status of a print job to be executed by the image forming apparatus in response to the print request; and
a request receiving step of receiving the print request from the information processing apparatus, and returning a response to the print request,
wherein, in the request receiving step, the response including a command which controls the information processing apparatus to send a status acquisition request of a print job to the image forming apparatus being returned to the information processing apparatus, and
in the management step, a status of the managed print job being updated in accordance with a status of the print job received from the information processing apparatus;
in the information processing apparatus,
a sending step of sending the print request to the print server;
a request step of sending the status acquisition request of the print job to the image forming apparatus in accordance with the command included in the response from the print server to the print request sent in the sending step; and
a notification step of notifying the print server of a status of the print job returned from the image forming apparatus as a response to the status acquisition request of the print job sent in the request step,
wherein, in the management step in said print server, it is determined whether or not an end predicted time of processing for a print job has elapsed, and
when the end predicted time has elapsed, in the request receiving step in said print server, the response including the command is returned to said information processing apparatus.

7. A control method in a print job management system including an information processing apparatus, a print server, and an image forming apparatus, comprising:
in the print server,
a management step of receiving a print request from the information processing apparatus, and to manage a status of a print job to be executed by the image forming apparatus in response to the print request; and
a request receiving step of receiving the print request from the information processing apparatus, and returning a response to the print request,
wherein, in the request receiving step, the response including a command which controls the information processing apparatus to send a status acquisition request of a print job to the image forming apparatus being returned to the information processing apparatus, and
in the management step, a status of the managed print job being updated in accordance with a status of the print job received from the information processing apparatus;
in the information processing apparatus,
a sending step of sending the print request to the print server;
a request step of sending the status acquisition request of the print job to the image forming apparatus in accordance with the command included in the response from the print server to the print request sent in the sending step; and a notification step of notifying the print server of a status of the print job returned from the image forming apparatus as a response to the status acquisition request of the print job sent in the request step, wherein, in the management step in said print server, it is determined whether or not a predetermined time period has elapsed since a reception time of a status of a print job from said information processing apparatus, and when the predetermined time period has elapsed, in the request receiving step in said print server, the response including the command is returned to said information processing apparatus.

8. The method according to one of claims 5, 6, and 7, wherein in the notification step in said information processing apparatus, a status of the print job is notified of the print server according to the status of the print job returned from said image forming apparatus.

9. A print server in a print job management system including an information processing apparatus, a print server, and an image forming apparatus, comprising:

a management unit configured to receive a print request from the information processing apparatus, and to manage a status of a print job to be executed by the image forming apparatus in response to the print request; and a request receiving unit configured to receive the print request from the information processing apparatus, and to return a response to the print request, wherein said request receiving unit returns the response including a command which controls the information processing apparatus to send a status acquisition request of a print job to the image forming apparatus to the information processing apparatus, and said management unit updates a status of the managed print job in accordance with a status of the print job received from the information processing apparatus, wherein said management unit determines whether or not a predetermined time period has elapsed since the beginning of processing for a print job, and when the predetermined time period has elapsed, said request receiving unit of said print server returns the response including the command to said information processing apparatus.

10. A print server in a print job management system including an information processing apparatus, a print server, and an image forming apparatus, comprising:

a management unit configured to receive a print request from the information processing apparatus, and to manage a status of a print job to be executed by the image forming apparatus in response to the print request; and a request receiving unit configured to receive the print request from the information processing apparatus, and to return a response to the print request, wherein said request receiving unit returns the response including a command which controls the information processing apparatus to send a status acquisition request of a print job to the image forming apparatus to the information processing apparatus, and said management unit updates a status of the managed print job in accordance with a status of the print job received from the information processing apparatus, wherein said management unit determines whether or not an end predicted time of processing for a print job has elapsed, and when the end predicted time has elapsed, said request receiving unit of said print server returns the response including the command to said information processing apparatus.

11. A print server in a print job management system including an information processing apparatus, a print server, and an image forming apparatus, comprising:

a management unit configured to receive a print request from the information processing apparatus, and to manage a status of a print job to be executed by the image forming apparatus in response to the print request; and a request receiving unit configured to receive the print request from the information processing apparatus, and to return a response to the print request, wherein said request receiving unit returns the response including a command which controls the information processing apparatus to send a status acquisition request of a print job to the image forming apparatus to the information processing apparatus, and said management unit updates a status of the managed print job in accordance with a status of the print job received from the information processing apparatus, wherein said management unit of said print server determines whether or not a predetermined time period has elapsed since a reception time of a status of a print job from said information processing apparatus, and when the predetermined time period has elapsed, said request receiving unit of said print server returns the response including the command to said information processing apparatus.

* * * * *